US007853268B2

(12) United States Patent
Karaoguz et al.

(10) Patent No.: US 7,853,268 B2
(45) Date of Patent: Dec. 14, 2010

(54) GPS ENABLED CELL PHONE LOCATION TRACKING FOR SECURITY PURPOSES

(75) Inventors: Jeyhan Karaoguz, Irvine, CA (US); James D. Bennett, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 1272 days.

(21) Appl. No.: 11/069,659

(22) Filed: Mar. 1, 2005

(65) Prior Publication Data

US 2006/0166679 A1 Jul. 27, 2006

Related U.S. Application Data

(60) Provisional application No. 60/647,255, filed on Jan. 26, 2005.

(51) Int. Cl.
*H04W 24/00* (2009.01)
*G08B 13/14* (2006.01)

(52) U.S. Cl. .................. 455/456.1; 340/572.1
(58) Field of Classification Search ........... None
See application file for complete search history.

(56) References Cited

U.S. PATENT DOCUMENTS 6,059,576 A * 5/2000 Brann ................ 434/247

| 2001/0052849 | A1* | 12/2001 | Jones ............... | 340/572.1 |
| 2002/0164995 | A1* | 11/2002 | Brown et al. ........ | 455/456 |
| 2005/0075116 | A1* | 4/2005 | Laird et al. ........ | 455/456.3 |

* cited by examiner

*Primary Examiner*—Lester Kincaid
*Assistant Examiner*—Joel Ajayi
(74) *Attorney, Agent, or Firm*—Garlick Harrison & Markison; Bruce E. Garlick (57) ABSTRACT

A wireless terminal enacts a boundary violation notification rule that includes geographic boundary and an action or a mobility violation notification rule that includes a mobility parameter and an action. The wireless terminal determines its location and/or rate of motion by accessing the GPS receiver of the wireless terminal. The wireless terminal then compares its location to the geographic boundary and/or its rate of motion to the mobility parameter. When comparison is unfavorable, the wireless terminal executes the action by sending a message to a destination device via its wireless interface and a supporting wireless network infrastructure. This message may be sent to a partnered wireless terminal, a partnered landline terminal, a monitoring location, or to another location to which the message is relevant. In addition to sending the message, the wireless terminal may also issue an audible alarm, take a picture, or perform another action.

33 Claims, 11 Drawing Sheets

GPS ENABLED CELL PHONE LOCATION TRACKING FOR SECURITY PURPOSES

CROSS REFERENCE TO RELATED APPLICATION

This application claims priority to U.S. Provisional Patent Application Ser. No. 60/647,255, filed Jan. 26, 2005, which is incorporated herein by reference for all purposes.

BACKGROUND

1. Field of the Invention

The present invention relates generally to wireless communications; and more particularly to operations relating to the location/mobility of a wireless terminal.

2. Background of the Invention

Communication systems are well known. Communication systems include both wired communication systems and wireless communication systems. Wired communication systems include the Public Switched Telephone Network (PSTN), Wide Area Networks (WANs), Local Area Networks (LANs), and other networks that use wired or optical media for the transmission of data. Wireless communication systems include cellular telephone systems, satellite communication systems, Wireless Local Area Networks (WLANs), Wireless Personal Area Networks (WPANs), and other networks that employ a wireless link between a serviced terminal and a network infrastructure. Of course, many communications are serviced using a combination of wireless communication systems and wired communication systems.

With the current state of society, security of the person is of increasing importance. For example, parents who have children in daycare are particularly concerned for their safety. Likewise, the safety of adults as well is also a concern. Because many people typically carry cellular telephones and/or other wireless terminals, it would be appropriate to use such cellular telephones/wireless terminals to address such security concerns. Further, because of the increasing reduction in size of wireless terminals, the use of such wireless terminals for security purposes becomes even more attractive. Thus, there is a need in the art for techniques for utilizing wireless terminals to address security concerns.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
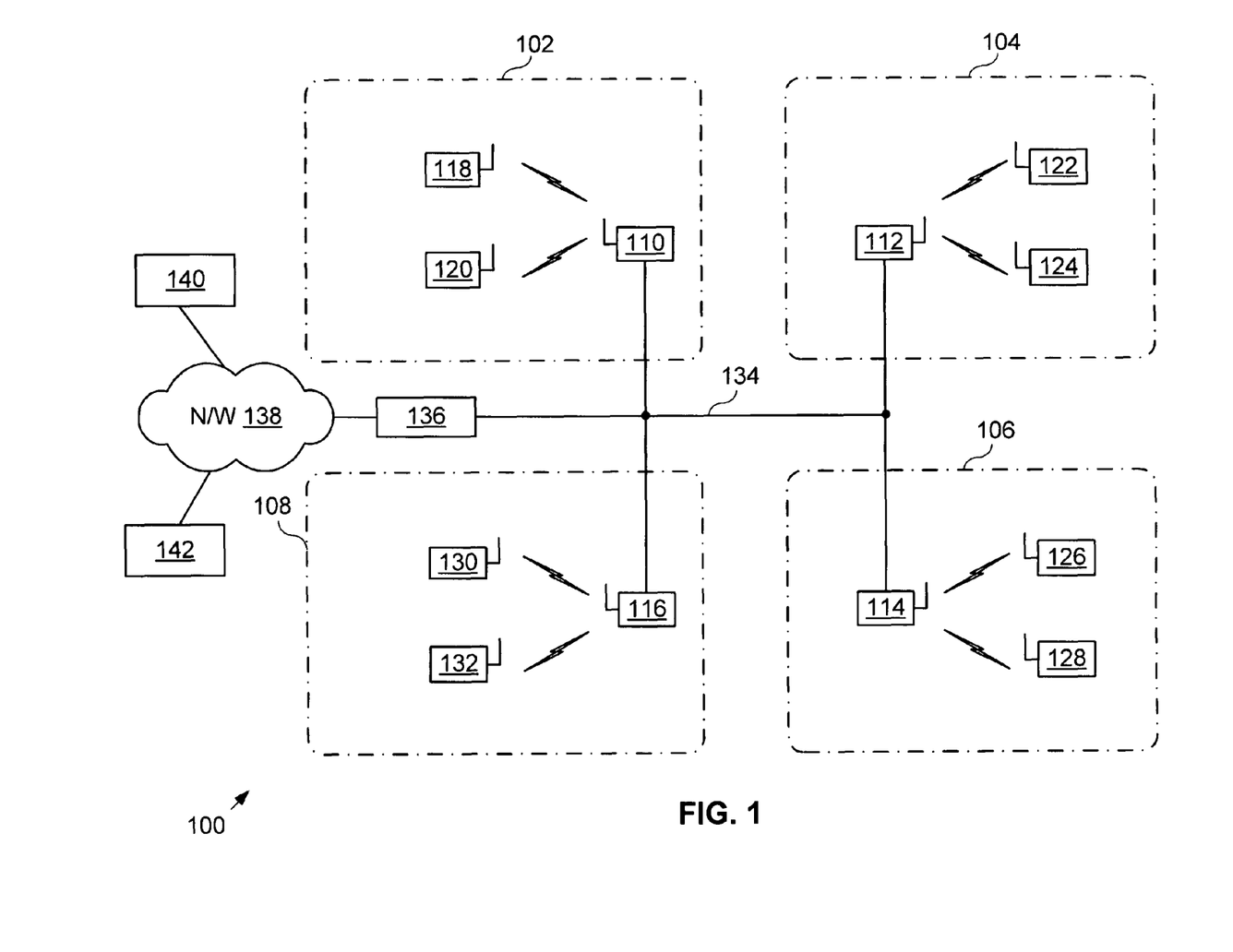
FIG. 1 is a system diagram illustrating a wireless communication system that services a wireless terminal operating according to the present invention.

FIG. 1 is a system diagram illustrating a wireless communication system that services a wireless terminal operating according to the present invention. The wireless communication system 100 of FIG. 1 shows diagrammatically geographic boundaries 102, 104, 106, and 108. Each of these geographic boundaries 102 through 108 may correspond to a usual traffic pattern of the wireless terminal. For example, geographic boundary 102 may correspond to an office building which the user of the wireless terminal works. Likewise, geographic boundary 104 may correspond to a user's home. Further, geographic boundary 106 may correspond to a daycare center in which the user of the wireless terminal spends daytime hours. Finally, geographic boundary 108 may correspond to an area or location that the user of the wireless terminal may frequent from time to time.

Each geographic boundary includes one or more servicing base stations and/or wireless access points (WAPs). For example, geographic boundary 102 includes base station/WAP 110. Likewise, geographic boundary 104 may include base stations/WAP 112, geographic boundary 106 may include base station/WAP 114, and geographic boundary 108 may include base station/WAP 116. The reader should understand that the structure of FIG. 1 is used only to convey the principles of the present invention and is not intended to be a detailed description of a cellular wireless communication system, a Wireless Local Area Network (WLAN) or a Wireless Personal Area Network (WPAN). As is shown, base station/WAP 110 supports wireless terminals 118 and 120 within geographic boundary 102. Likewise, base station/WAP 112 supports wireless terminals 122 and 124 when in geographic boundary 104. Further, base station/WAP 114 supports wireless terminals 126 and 128 when in geographic boundary 106. Finally, base station/WAP 116 supports wireless terminal 130 and 132 when within geographic boundary 108. The base stations/WAPs 110, 112, 114, and 116 are serviced via network backbone 134 and interface device 136. The interface device 136 couples the backbone network 134 to another network 138. The another network 138 may include a Local Area Network (LAN), a Wide Area Network (WAN), the Internet, or any other type of network that couples the network backbone 134 via the network interface 136 to computers or terminals 140 and 142.

The operation of the wireless communication system 100 and the wireless terminals 118-132 supported thereby will be described further with reference to FIGS. 2-8 and 10-11. The structure of the wireless terminals 118-132 will be described further with reference to FIG. 9. Generally, a wireless terminal 118 enacts a boundary violation notification rule that includes geographic boundary and an action. The wireless terminal 118 determines its location by accessing a Global Positioning System (GPS) receiver of the wireless terminal 118. The wireless terminal 118 then compares its location to the geographic boundary, e.g., 102, of the boundary violation notification rule. When the location of the wireless terminal 118 compares unfavorably to the geographic boundary 102, the wireless terminal 118 executes the action by sending a message to a destination device, e.g., 140, via its wireless interface and a supporting wireless network infrastructure 110, 134, and 136. This message may be sent to a partnered wireless terminal, e.g., 132, a partnered landline terminal, e.g., 142, a monitoring location, e.g., 140, or to another location to which the message is relevant. In addition to sending the message, the wireless terminal 118 may also issue an audible alarm via its user interface. This audible alarm may be particularly useful when the wireless terminal is used for a child or other secured individual and for which attention is required because of the violation of the geographic boundary.

With another aspect of the present invention, executing the action may further include taking a picture using a camera of the wireless terminal 118. This picture may then be transmitted from the wireless terminal 118 to the destination device, e.g., 140, via the supporting wireless network infrastructure to provide additional information to a person or organization that monitors the wireless terminal. The wireless terminal 118 may also transmit its location to the destination device via the wireless interface and the supporting network infrastructure.

The boundary violation notification rule may further include a time component. In such case, the action is executed only when a current time of the mobile terminal 118 compares unfavorably to the time component. Operation may further require that the wireless terminal 118 receive a locate request from a querying device, e.g., 142, via a supporting wireless network infrastructure. In response to the locate request, given that there is sufficient authority to do so, the location of the wireless terminal 118 is provided in response to the query via the supporting wireless network infrastructure. Password or other rules may apply to such a request. The boundary violation notification rule may be keyed into the wireless terminal 118 via the user interface. Alternately, the boundary violation notification rule may be entered via a remote terminal, e.g., 140, and downloaded to the wireless terminal. According to another aspect of the present invention, the wireless terminal 118 receives a message from a monitoring device, e.g., 142. In such case, when the boundary violation notification rule is violated, a first action may be to send a message to the user of the wireless terminal 118 to request input. When this input is satisfied, no additional actions are taken. However, when this input is not satisfied, security personnel may be dispatched to the reported location to assist in securing the user of the wireless terminal 118.

According to a second embodiment of the present invention, the wireless terminal 118 enacts a mobility violation notification rule that includes a mobility parameter and an action. The wireless terminal 118 then determines a rate of motion of the wireless terminal by accessing a GPS receiver. Then, the wireless terminal 118 compares the rate of motion of the wireless terminal to the mobility parameter of the mobility violation notification rule. When the rate of motion of the wireless terminal 118 compares unfavorably to the mobility violation notification rule, the wireless terminal executes the action. In executing the action, the wireless terminal 118 sends a message to a destination device via supporting wireless network infrastructure. The first embodiment and second embodiment may be combined to such that both a mobility requirement and a location requirement are enacted. With the second embodiment of the present invention, the rate of motion of the wireless terminal 118 may compare unfavorably to the mobility parameter when the rate of motion exceeds a mobility or, oppositely, if the rate of motion is less than a mobility limit. For example, when the wireless terminal 118 secures a child, the action is executed when the rate of motion exceeds a maximum walking speed. As another example, the action is executed when the wireless terminal 118 becomes stationary for a period of time.

According to another aspect of the present invention, a servicing base station/WAP 114 may service a premises 106, such as a bank. A monitoring location, e.g., 140, may send a query to all wireless terminals 126 and 128 within the premises. This query may request identity of the wireless terminals 126 and 128. In response to this query, the wireless terminals 126 and 128 reply, providing their identities. This query may also request that the wireless terminals 126 and 128 perform other operations as well, such as taking pictures and relating the pictures to the monitoring location 140. During a robbery of the premises 106, the operations of the present invention could be employed to provide additional information, e.g., pictures to the monitoring location 140. Alternately, the identities of the wireless terminals 126 and 128 could be employed to validate transactions being initiated by the users of the wireless terminals 126 and 128.

Figure 2:
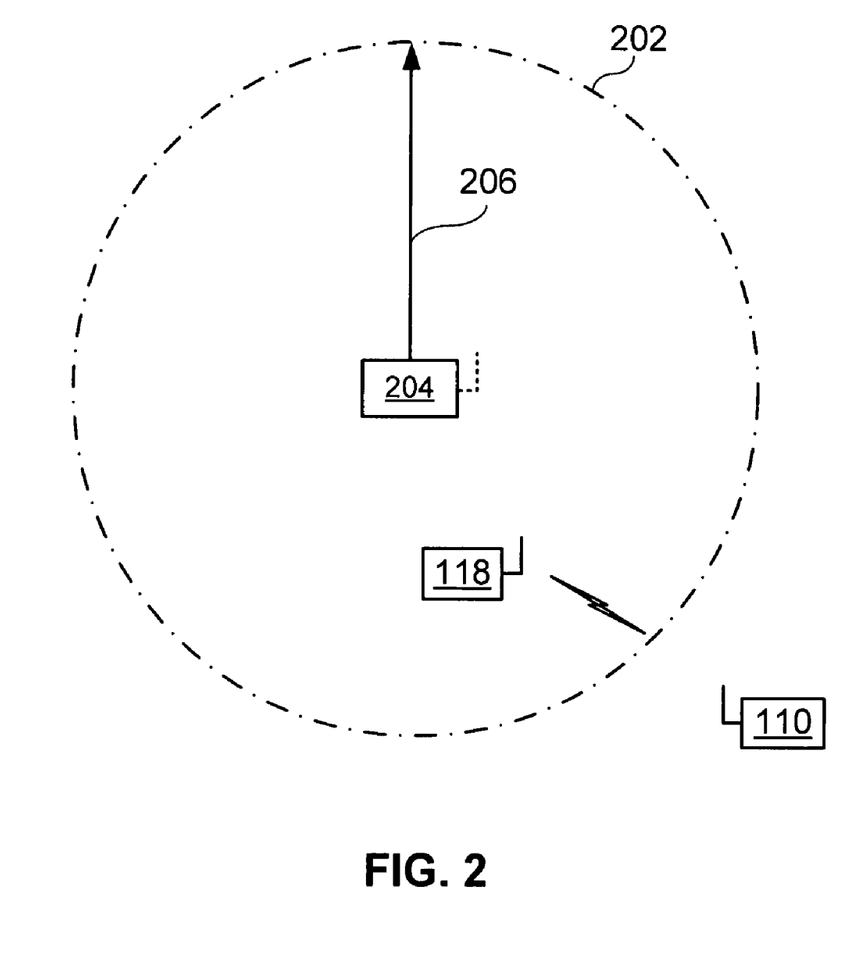
FIG. 2 is a system diagram illustrating a first aspect of the present invention with respect to a boundary violation notification rule.

FIG. 2 is a system diagram illustrating a first aspect of the present invention with respect to a boundary violation notification rule. A geographic boundary 202 is defined about a geographic location 204. The geographic location 204 may be a building, a central location within a compound, a daycare building, a school, an office building, or another geographic location that is of interest for the security of the user of the wireless terminal 120. Alternately, the geographic location 204 could be base station/WAP. In one particular aspect the geographic boundary 202 may be defined about the geographic location 204 with a radius 206. This radius may be constant about the geographic location 204 or may vary with a relative angle. When the geographic location 204 is a base station/WAP, the base station/WAP itself or the wireless terminal 110 could determine the proximity of the wireless terminal 110 to the base station WAP 204.

According to one aspect of the boundary violation notification rule, the location of the wireless terminal 120 compares unfavorably to the geographic boundary 202 when the location is external to the geographic boundary 202. According to another aspect of the boundary violation notification rule, the location of the wireless terminal 120 compares unfavorably to the geographic boundary 202 when the location is internal to the geographic boundary 202. The first aspect is particularly useful for example when the user of the wireless terminal is a small child that is in daycare. In such case, the child is presumed to be secure when within the premises of the daycare. According to the second aspect, the user of the wireless terminal may be banned from being proximate to particular locations, e.g., when subject to a restraining order. In such case, when the user of the wireless terminal becomes proximate to a banned location, notification is provided. The geographic boundary 202 may be substantially uniform with regard to the geographic location 202. Alternately, the geographic boundary may be non-uniform as will be described with reference to FIG. 3.

Figure 3:
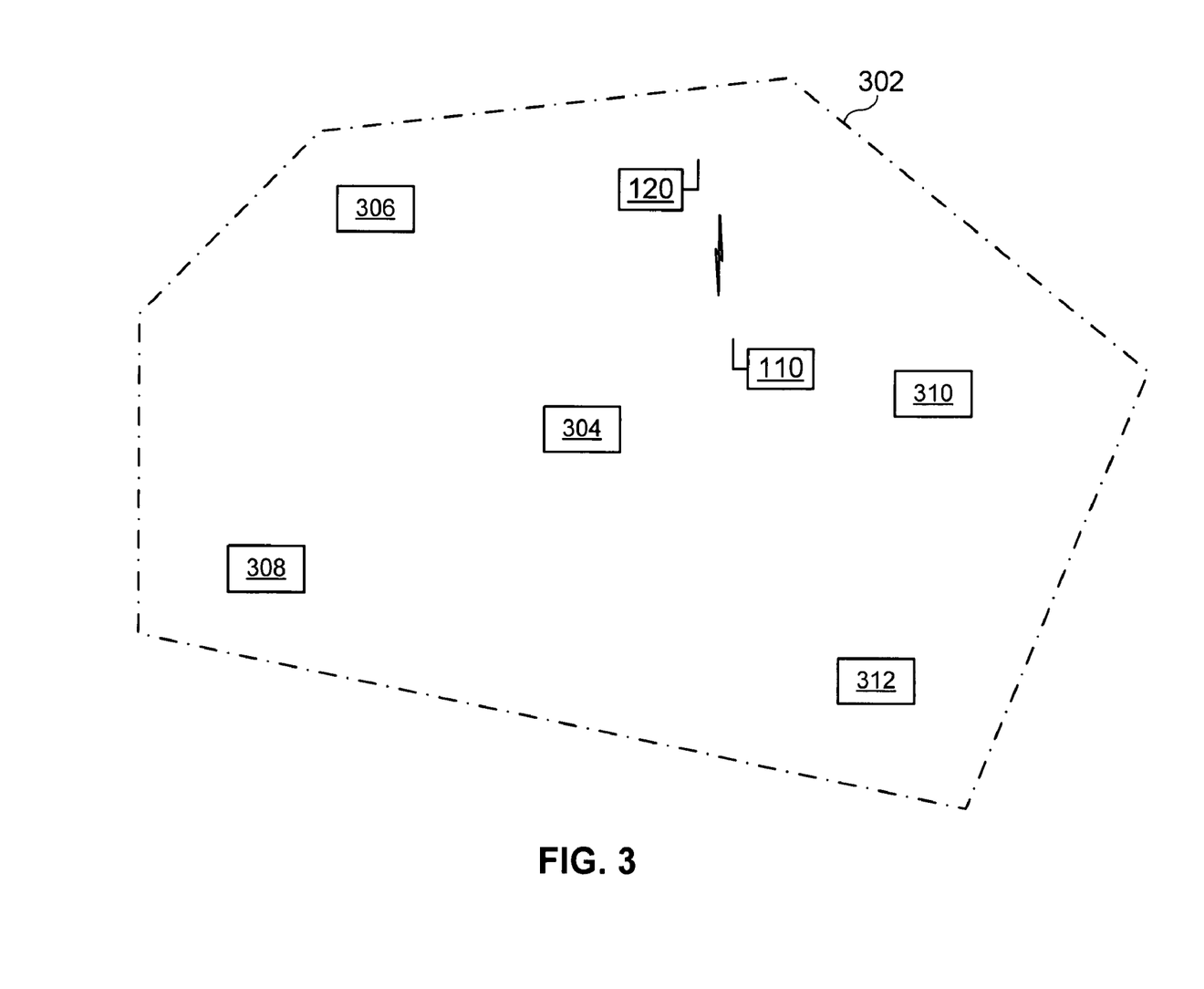
FIG. 3 is a system diagram illustrating a second aspect of the present invention with respect to a boundary violation notification rule.

FIG. 3 is a system diagram illustrating a second aspect of the present invention with respect to boundary violation notification rules. A geographic boundary 302 may also be defined by a plurality of geographic locations 304, 306, 308, 310 and 312. In such case, the geographic boundary 302 has a non-uniform shape. However, the geographic boundary 302 has particular relevance to the user of the wireless terminal 120. This geographic boundary 302 may correspond to the area of a school, for example, within which a child spends his/her school hours. Thus, during school hours, the geographic boundary 302 is employed. However, after school hours, the geographic boundary 302 would not apply and the time constraint. Thus, a time constraint would be employed to address this limitation.

In another example, the geographic boundary 302 may correspond to a minimum security prison, a work place, or another geographic location in which users of wireless terminals are expected to be present during certain times/all times. With the operations of the present invention, such boundary rules may be enacted with minimum cost and complexity.

As will be described further with reference to FIG. 10, a user may define a geographic boundary via interaction with a server computer, e.g., 1010. In such case, the server computer may display a map to the user and the user may draw lines upon the map. Based upon the lines drawn on the map by the user, the server computer 1010 may determine GPS coordinates of the geographic boundary and download the GPS coordinates of the geographic boundary to the wireless terminal. The wireless terminal may then compare its own GPS coordinates to the downloaded GPS coordinates to determine whether its own GPS coordinates compare unfavorably to the downloaded GPS coordinates that define the geographic boundary. In an alternate operation, the map along with the boundary lines drawn thereupon may be downloaded to the wireless terminal. The wireless terminal may then interpret the map along with its own GPS location coordinates to determine whether the geographic boundary set forth by the lines is violated by a position of the wireless terminal.

Figure 4:
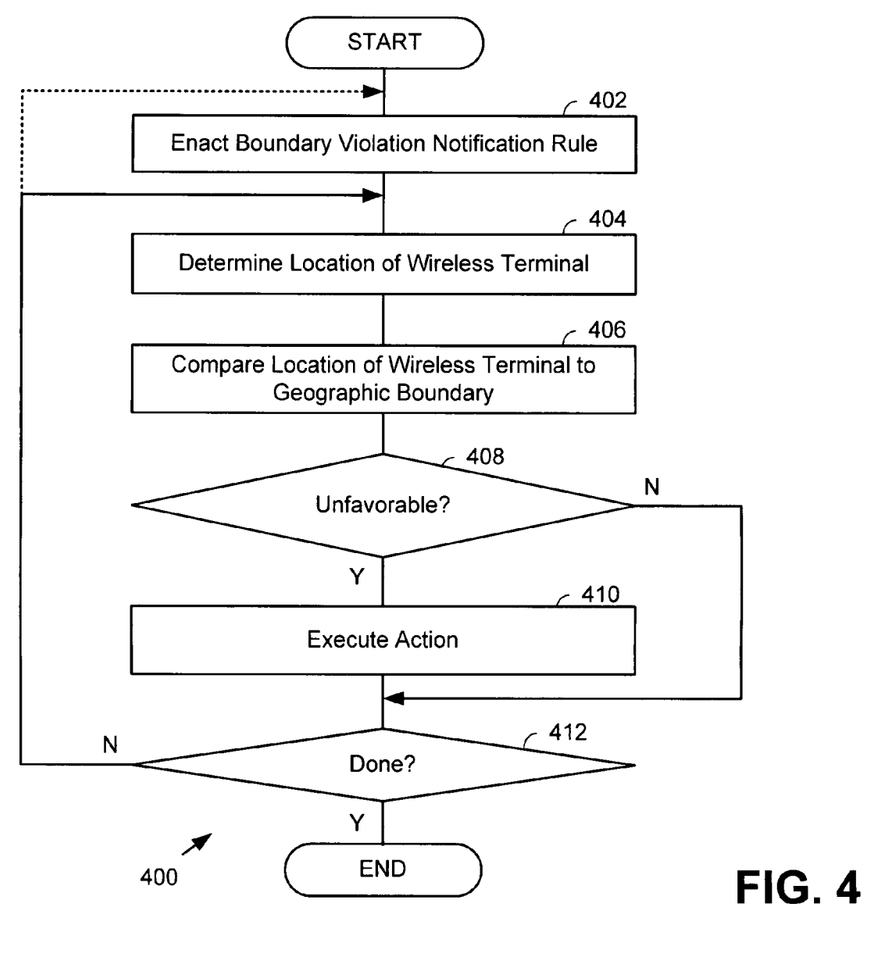
FIG. 4 is a flow chart illustrating operation according to a first embodiment of the present invention.

FIG. 4 is a flow chart illustrating operation according to a first embodiment of the present invention. Operation 400 commences with enacting a boundary violation notification rule that includes a geographic boundary and an action (step 402). Operation continues in determining a location of the wireless terminal by accessing a GPS receiver of the wireless terminal (step 404). In another embodiment of the present invention, the location of the wireless terminal may be determined via by accessing a servicing base station/WAP instead of accessing the GPS receiver of the wireless terminal.

Operation continues in comparing the location of the wireless terminal to the geographic boundary of the boundary violation notification rule (step 406). When the comparison is unfavorable, as determined at step 408, the action is executed by the wireless terminal by sending a message from the wireless terminal to a destination device via a supporting wireless network infrastructure (step 410). However, if the comparison of step 408 is not favorable, such action at step 410 is not executed. From both an unfavorable and a non-unfavorable comparison at step 408 and from step 410, operation proceeds to step 412 where it is determined whether operation is done. If it is done, operation ends. However, if the operation is not done at step 412, operation returns to step 404. Alternately, operation could return to step 402 where the same or differing boundary violation notification rules are enacted.

Various examples of the actions that may be executed by the wireless terminal will be described further with reference to FIG. 7. As was shown with reference to FIGS. 2 and 3, the geographic boundary may be defined as uniform or as non-uniform boundary. According to one aspect of the present invention, the location of the wireless terminal compares unfavorably to the geographic boundary then the location is internal to the geographic boundary. Alternately, according to another aspect of the present invention, the location of the wireless terminal compares unfavorably to the geographic boundary when the location of the wireless terminal is external to the geographic boundary.

Figure 5:
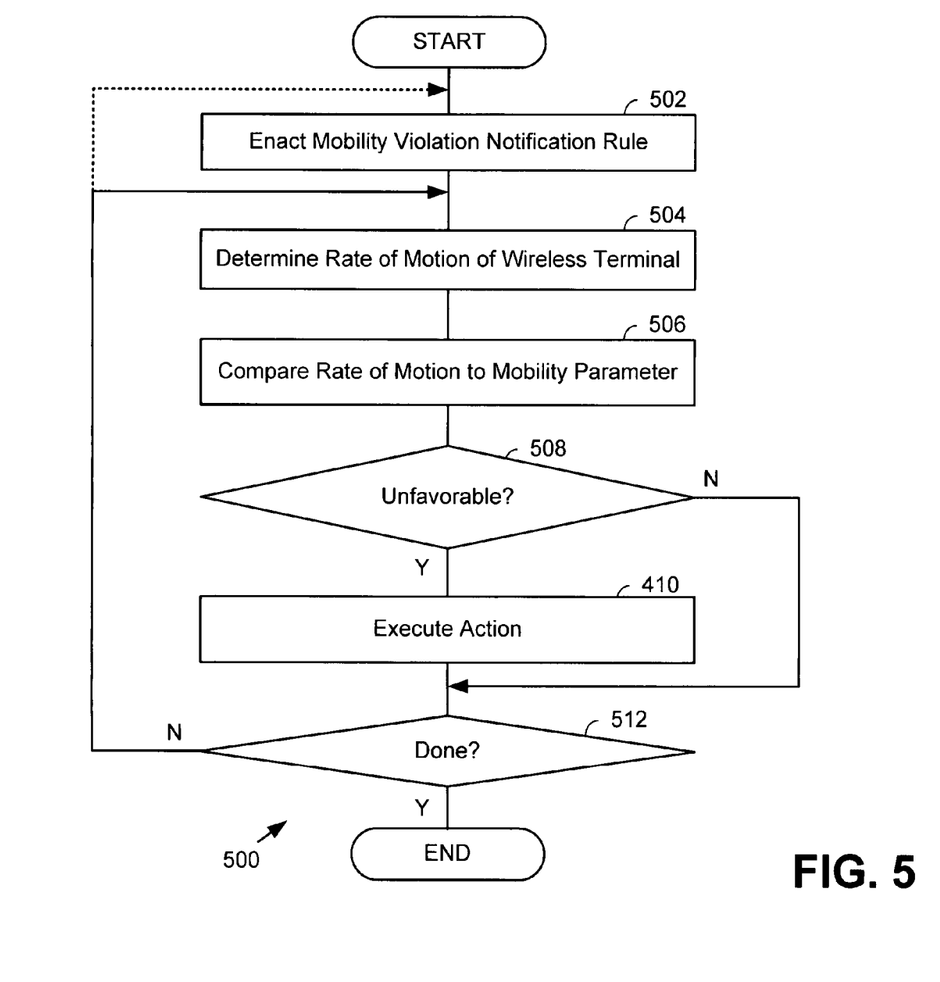
FIG. 5 is a flow chart illustrating operation according to a second embodiment of the present invention.

FIG. 5 is a flow chart illustrating operation according to a second embodiment of the present invention. As shown in FIG. 5 operation 500 commences in enacting a mobility violation notification rule that includes a mobility parameter and an action (step 502). Operation continues in determining a rate of motion of the wireless terminal by accessing a GPS receiver of the wireless terminal (step 504). The rate of motion of the wireless terminal is then compared to the mobility parameter of the mobility violation notification rule (step 506). If comparison is unfavorable at step 508, an action is executed at step 410. However, if the comparison is not unfavorable at step 508, operation proceeds directly to step 512. The actions at step 410 will be described further with reference to FIG. 7. Operation from both step 410 and from a non unfavorable determination at step 508 proceeds to step 512. If operation is completed at step 512 operation ends. However, if operation is not completed as determined at step 512 operation returns to step 504 or alternately to step 502.

Figure 6:
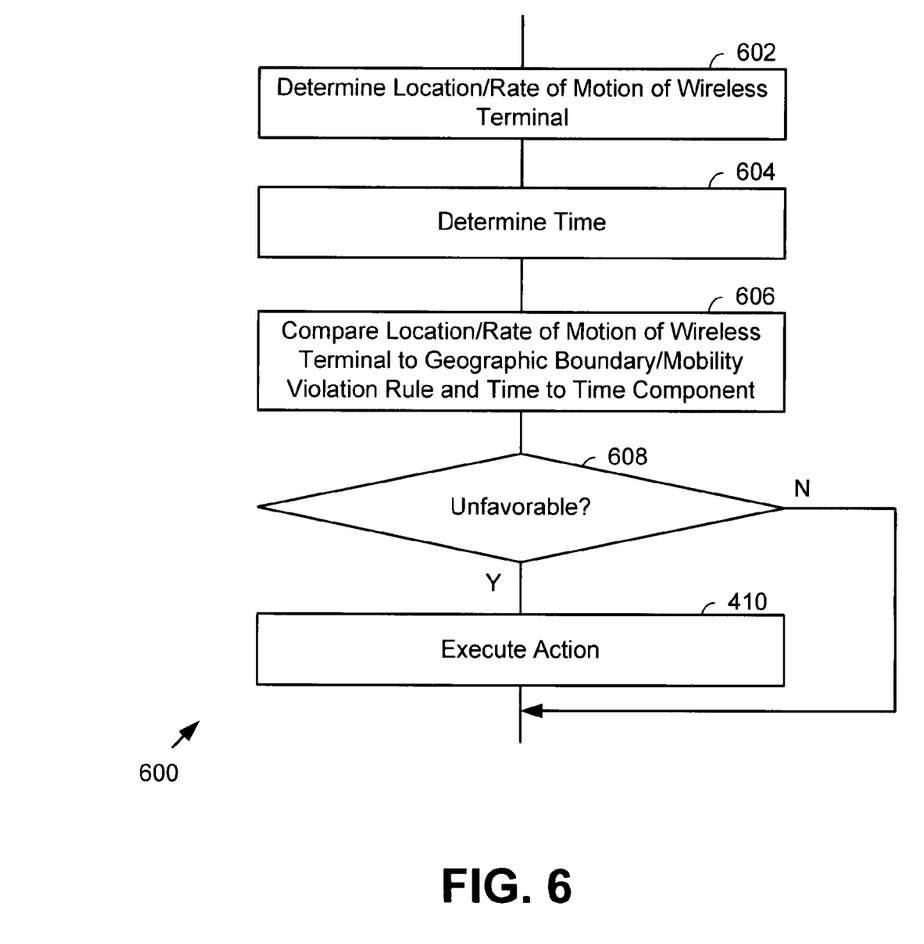
FIG. 6 is a flow chart illustrating operation according to a third embodiment of the present invention that incorporates aspects of both the first and second embodiments.

FIG. 6 is a flow chart illustrating operation according to a third embodiment of the present invention that incorporates aspects of the first and second embodiments. According to the embodiment 600 of FIG. 6, operation commences in determining the location/rate of motion of the wireless terminal (step 602). The operations of step 602 may correspond to steps 402 and 502 of FIGS. 4 and 5, respectively. Then, the wireless terminal determines its local time via accessing an internal clock (step 604). In an alternate operation, the wireless terminal may determine its time by accessing the supporting wireless network infrastructure. The wireless terminal then compares its location/rate of motion to the geographic boundary/mobility violation rule and also compares the time to a time component of these rules (step 606). If these comparisons are partially or fully unfavorable as determined at step 608, operation proceeds to step 410 where the action is executed. However, if these comparisons are not unfavorable as determined at step 608, operation does not include execution of step 410.

Figure 7:
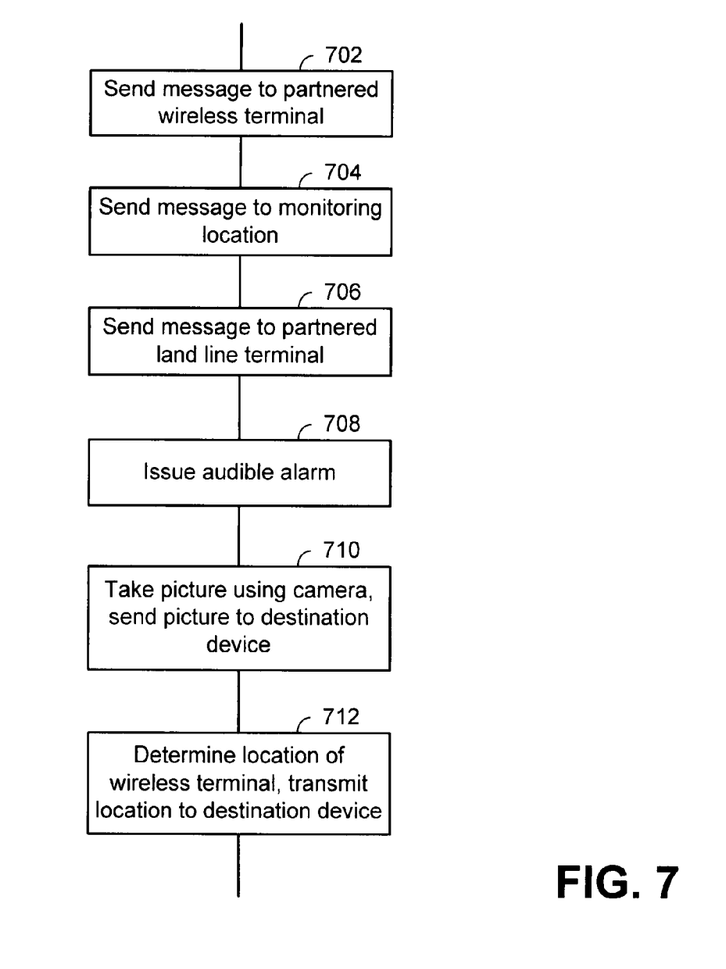
FIG. 7 is a flow chart illustrating aspects of the present invention in the execution of an action.

FIG. 7 is a flow chart illustrating aspects of the present invention in the execution of an action. One, more than one, or all of the actions 410 of FIG. 7 may be executed. These actions 410 may be executed in the order shown or in a differing order. The actions 410 may be executed in parallel with more than one of the actions 410 performed simultaneously. Further, the actions 410 may be performed sequentially based upon the preference of the user of the particular wireless terminal or upon another preference.

According to one action of the present invention, a message is sent from the wireless terminal, e.g. 120, to a partnered wireless terminal, e.g., 142 (step 720). According to a second embodiment of sending a message to a destination device via the supporting wireless network infrastructure the action includes sending a message to a monitoring location 140 (step 704). Further according to a third embodiment of sending the message to the destination device via a supporting wireless network infrastructure, the action includes sending a message to a partnered landline telephone (step 706). In any of the embodiments of steps 702, 704, or 706, these actions allow a monitoring individual or organization to act based upon the violation of the boundary violation notification rule or the mobility violation notification rule. For example, when the parent of a child in daycare receives a notification, the parent may immediately send a message to the wireless terminal, direct the wireless terminal to take a picture, direct the wireless terminal to issue an audible alarm, request a location report of the wireless terminal, or to take such other action that would be appropriate to protect the user of the wireless terminal, i.e. the child.

According to another embodiment of the action 410, the wireless terminal may immediately issue an audible alarm (step 708). This audible alarm may gain the attention of persons approximate to the wireless terminal that would cause them to investigate a particular situation. When the wireless terminal 120 is a reduced functionality wireless terminal worn by a child either around the wrist, around the neck, or around/on another body part, this audible alarm may bring attention to the child to allow a law enforcement officer to determine whether the child is being abducted or otherwise improperly moved. Because one of the aspects of the present invention considers the mobility or rate of motion of the wireless terminal 120, if a child is taken into a car, the mobility violation notification rule would be violated and the action would, for example, be employed to issue the alarm or to take a picture using the camera and send the picture to a destination device (step 710). Further, execution of the action may cause the wireless terminal to determine its location and then transmit its location to a destination device (step 712). The location of the wireless terminal may be used by a law enforcement agency or another person to determine the location of the user of the wireless terminal.

Figure 8:
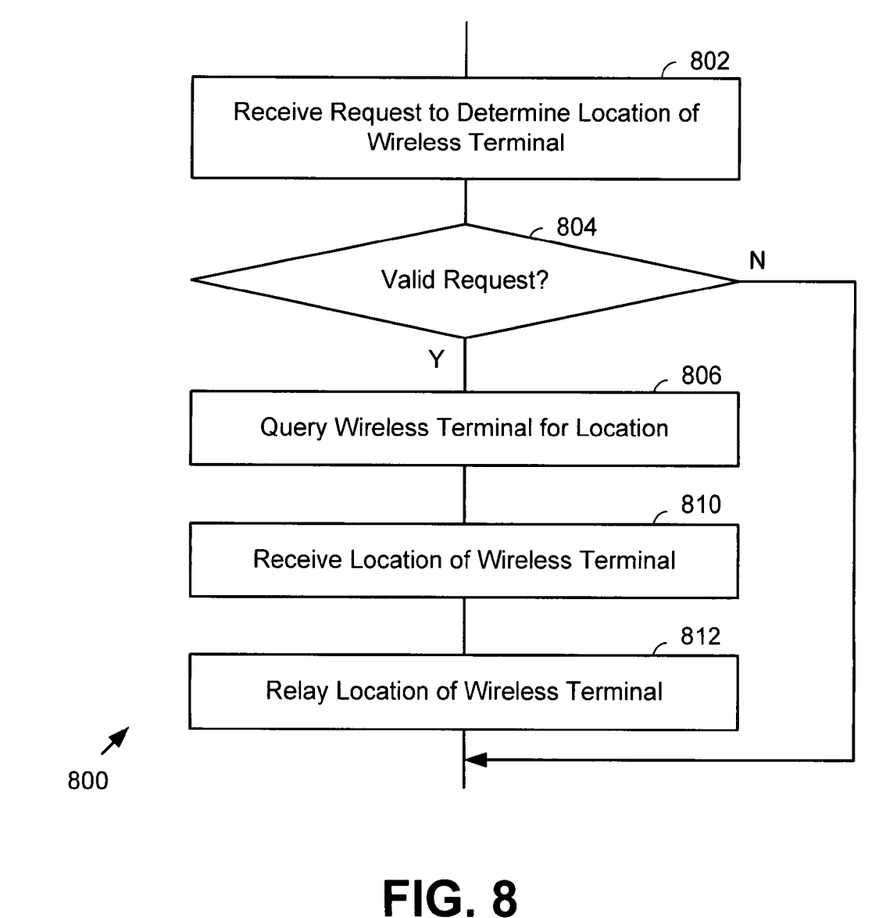
FIG. 8 is a flow chart illustrating an operation of the present invention in reporting a location of a wireless terminal.

FIG. 8 is a flow chart illustrating an operation of the present invention in reporting a location of a wireless terminal. The operation 800 at FIG. 8 commences in receiving a request to determine a location of the wireless terminal (step 802). When the user of the wireless terminal is a child, a parent, or simply a user for which the location is of interest, the servicing device would first determine if the request is valid (step 804). Validation of the request may require a password entry by the requesting person or terminal, or such other validation mechanism that would be appropriate in the given operation. If the request is valid as in step 804, the servicing device, via the supporting wireless network infrastructure, queries the wireless terminal for its location (step 806). In response, the wireless terminal would determine its location and transmit its location to the requesting device. The requesting device would then receive the location of the wireless terminal (step 810) and relay the location of the wireless terminal (step 812) to a requesting device. Because of privacy concerns, it may be the case that authority to determine the location of a minor to wireless terminal would have to be established prior to request by the requesting device. Alternately, law enforcement agencies, parole agents, or other governmental entities may have blanket authority to determine location of wireless terminal coupled or used by particular users of the wireless terminal. For example, a criminal on parole may have coupled thereto a wireless terminal that is a condition of the parole itself. In such case, the location of the parolee would be trackable because of the constant possession of the wireless terminal. Another example, a relative may give authority to his other relatives to track his or her location via the wireless terminal. In this case, the individuals tracking the location of the user will feel secure in the knowledge that the user is in a safe location.

Figure 9:
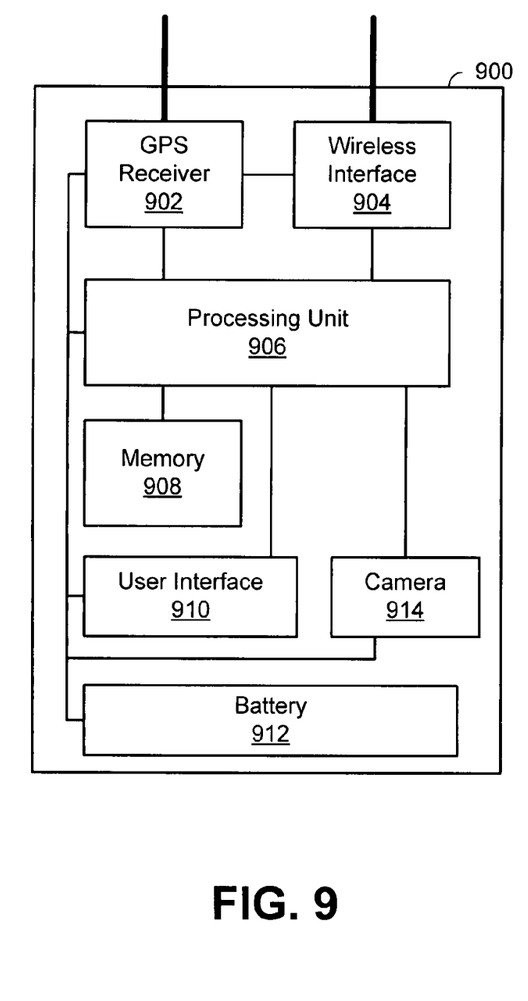
FIG. 9 is a block diagram illustrating a wireless terminal constructed and operating according to the present invention.

FIG. 9 is a block diagram illustrating a wireless terminal constructed and operating according to the present invention. As shown in FIG. 9, the wireless terminal 900 includes a GPS receiver 902, a wireless interface 904, a processing unit 906, memory 908, user interface 910, and a battery 912. The components of the wireless terminal 900 are typically contained within a hard case that provides protection from the elements. The wireless interface 904 will have particular structure and functionality based upon the type of the wireless terminal 900. For example, when the wireless terminal 900 is a cellular telephone, the wireless interface 904 will support a corresponding interface standard e.g., GSM, GPRS, EDGE, UMTS, 1xRTT, 1xEV-DO, 1xEV-DV, etc. The wireless interface 904 of the cellular telephone 904 may also/alternately support WLAN and/or WPAN functionality. When the wireless terminal is a WLAN terminal for example, the wireless interface 904 will support standardized communication according to the IEEE 802.11x group of standards, for example. When the wireless terminal is a WPAN device, the wireless interface 904 would support the Bluetooth interface standard or another WPAN standard such as the IEEE 802.15 standard, for example. In any case, the wireless interface 904 may support all or a subset of cellular telephone, WLAN, and WPAN operations.

The processing unit 906 may include any type of processor such as a microprocessor, a digital signal processor, an Application Specific Integrated Circuit (ASIC), or a combination of processing type devices. The processing unit 906 is operable to execute a plurality of software instructions that are stored in memory 908 and downloaded for execution. The processing unit 906 may also include specialized hardware required to implement particular aspects of the present invention. Memory 908 may include SRAM, DRAM, PROM, flash RAM, or any other type of memory capable of storing data and instructions.

A user interface 910 may include a microphone, a speaker, a keypad, a screen, a touch screen, a voice recognition system, an optical recognition system that would authenticate a user's iris, for example, and/or any other type of interface that may be employed in the wireless terminal. In some embodiments, the user interface 910 may include therewith ability to service a headset including microphone and earpiece for the user. In some embodiments of the wireless terminal 900, the user interface 910 is of reduced functionality to minimize the size of the wireless terminal 900. In such case, programming of the wireless terminal 900 may be performed via the wireless interface 904. In such case, the wireless terminal 900 may be small enough to be worn around a child's wrist, around the neck, pinned to the inside of clothing, placed in a pocket, or concealed upon the person. Battery 912 powers the components of the wireless terminal 900.

Figure 10:
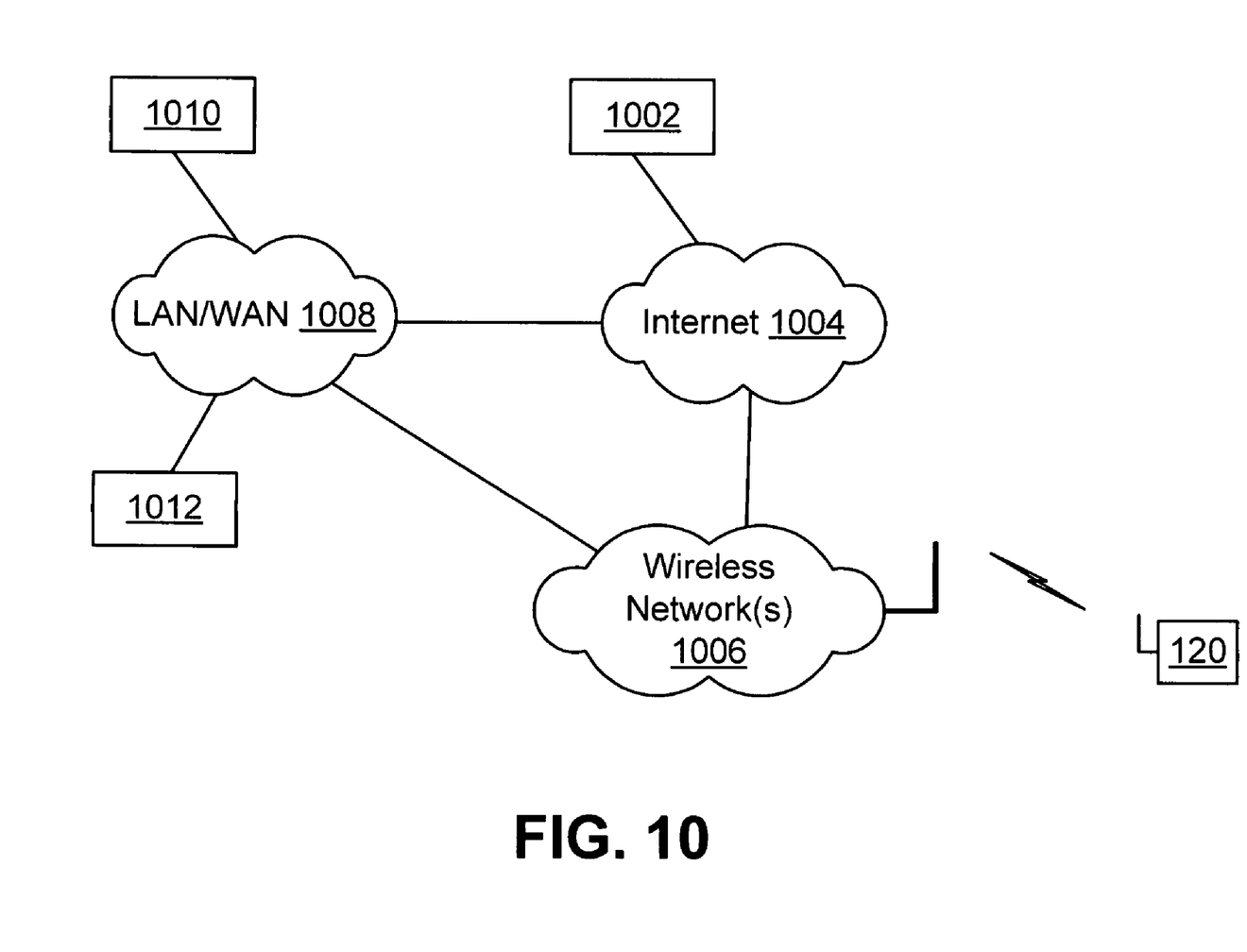
FIG. 10 is a block diagram illustrating a system that may be used to create and download boundary violation notification rules and mobility violation notification rules to the wireless terminal according to the present invention.

FIG. 10 is a block diagram illustrating a system that may be used to create and download boundary violation notification rules and mobility violation notification rules to the wireless terminal according to the present invention. The system of FIG. 10 includes a wireless network 1006 that supports wireless communications with the wireless terminal 120, the Internet 1002, and a LAN/WAN 1008 that intercouples with the Internet 1004 and the wireless network 1006. A server computer 1002 or 1010 or a user terminal 1012 may be employed to program the boundary violation notification rules and mobility violation notification rules for the wireless terminal 120. The user terminal 1012 may be a personal computer, laptop computer, or another type of device. According to an embodiment of the present invention, the user establishes a boundary violation notification rule(s) and/or mobility violation notification rule(s) via interaction with a server computer 1002 or 1010. Once the boundary violation notification rules and mobility violation notification rules are established, they may be downloaded to the wireless terminal 120 via the LAN/WAN 1008, Internet 1004, and the wireless network 1006.

A user may define a geographic boundary via interaction with a server computer, e.g., 1010. In such case, the server computer 1010 may display a map to the user and the user may draw lines upon the map. Based upon the lines drawn on the map by the user, the server computer 1010 may determine GPS coordinates of the geographic boundary and download the GPS coordinates of the geographic boundary to the wireless terminal 120. The wireless terminal 120 may then compare its own GPS coordinates to the downloaded GPS coordinates to determine whether its own GPS coordinates compare unfavorably to the downloaded GPS coordinates that define the geographic boundary. In an alternate operation, the map along with the boundary lines drawn thereupon may be downloaded to the wireless terminal 120. The wireless terminal 120 may then interpret the map along with its own GPS location coordinates to determine whether the geographic boundary set forth by the lines is violated by a position of the wireless terminal 120.

Figure 11:
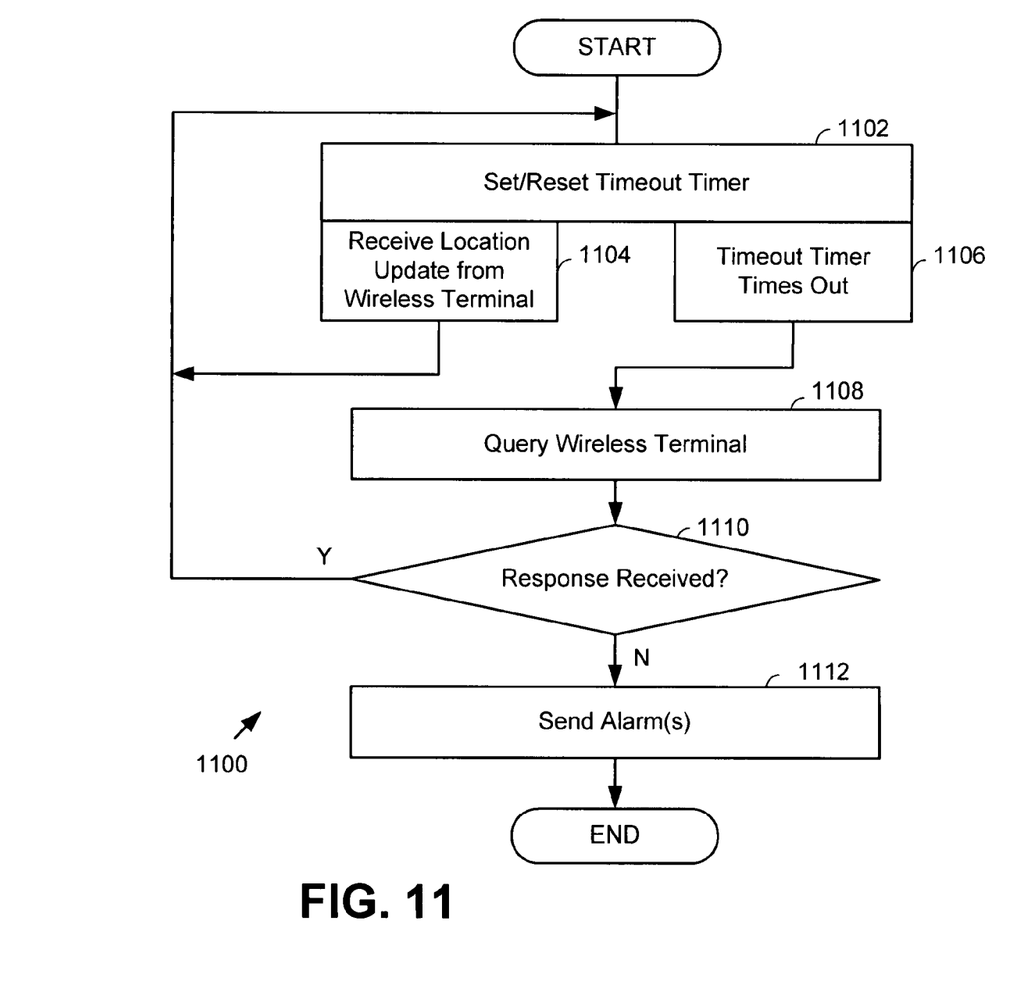
FIG. 11 is a flow chart illustrating an operation of the present invention in determining that a wireless terminal is missing and acting accordingly.

FIG. 11 is a flow chart illustrating an operation of the present invention in determining that a wireless terminal is missing and acting accordingly. When a wireless terminal is being used to monitor the location of a paired person, e.g., a child, it is imperative that the wireless terminal be functioning. Thus, the operations of FIG. 11 are employed to ensure that the wireless terminal continues to respond when monitored. Operation commences with setting a timeout timer at a monitoring location, by a monitoring wired terminal, a monitoring wireless terminal, or by another device (step 1102). The timeout timer may be implemented by the processor of a wireless terminal or by dedicated timing circuitry. Whenever a location update is received from the wireless terminal by the monitoring location or terminal, and the timeout timer has not expired (step 1104), operation returns to step 1102 where the timeout timer is reset.

When the timeout timer expires (step 1106), a query is sent to the wireless terminal by the monitoring location or monitoring terminal (step 1108). If a response is received from the wired terminal being monitored (positive result at step 1110), operation returns to step 1102 where the timeout timer is reset. If not response is received (negative result at step 1112), alarms are triggered (step 1112) or other notification is provided.

As one of average skill in the art will appreciate, the term "substantially" or "approximately," as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the terms "communicatively coupled" or "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled." As one of average skill in the art will further appreciate, the term "compares favorably," as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The invention disclosed herein is susceptible to various modifications and alternative forms. Specific embodiments therefore have been shown by way of example in the drawings and detailed description. It should be understood, however, that the drawings and description thereto are not intended to limit the invention to the particular form disclosed, but on the contrary, the invention is to cover all modifications, equivalents, and alternatives falling within the spirit and scope of the present invention as defined by the claims.

The invention claimed is:

1. A method for operating a wireless terminal comprising:
   enacting a boundary violation notification rule that includes a geographic boundary and an action;
   determining a location of the wireless terminal by accessing a Global Positioning System (GPS) receiver of the wireless terminal;
   comparing the location of the wireless terminal to the geographic boundary of the boundary violation notification rule; and
   when the location of the wireless terminal compares unfavorably to the geographic boundary, executing the action by:
   taking a picture using a camera contained within the wireless terminal;
   sending a message from the wireless terminal to a destination device via a supporting wireless network infrastructure, the message including the location of the wireless terminal and the picture, the picture available to assist in locating a user of the wireless terminal.

2. The method of claim 1, wherein sending the message to the destination device via a supporting network infrastructure is selected from the group consisting of at least:
   sending a message to a partnered wireless terminal;
   sending a message to a partnered land line terminal; and
   sending a message to a monitoring location.

3. The method of claim 1, wherein executing the action further comprises the wireless terminal issuing an audible alarm.

4. The method of claim 1, further comprising:
   determining a rate of motion of the wireless terminal; and
   including the rate of motion of the wireless terminal with the message.

5. The method of claim 1, wherein executing the action further comprises the wireless terminal transmitting the location of the wireless terminal to the destination device via the supporting wireless network infrastructure.

6. The method of claim 1, wherein the location of the wireless terminal compares unfavorably to the geographic boundary when the location is external to the geographic boundary.

7. The method of claim 1, wherein the location of the wireless terminal compares unfavorably to the geographic boundary when the location is internal to the geographic boundary.

8. The method of claim 1, wherein the geographic boundary is defined based upon proximity to a geographic location.

9. The method of claim 1, wherein:
   the boundary violation notification rule further comprises a time component; and
   the action is executed only when a current time of the mobile terminal compares unfavorably to the time component.

10. The method of claim 1, further comprising:
    receiving a locate request from a querying device via the supporting wireless network infrastructure; and reporting the location of the wireless terminal to the querying device via the supporting wireless network infrastructure.

11. The method of claim 1, further comprising receiving the boundary violation notification rule from a monitoring device.

12. The method of claim 1, further comprising:
receiving a location query from a monitoring device;
determining a location of the wireless terminal by accessing the GPS receiver; and
reporting the location of the wireless terminal to the monitoring device.

13. A method for operating a wireless terminal comprising:
enacting a mobility violation notification rule that includes a mobility parameter and an action;
determining location information and a rate of motion of the wireless terminal by accessing a Global Positioning System (GPS) receiver of the wireless terminal;
comparing the rate of motion of the wireless terminal to the mobility parameter of the mobility violation notification rule; and
when the rate of motion of the wireless terminal compares unfavorably to the mobility parameter of the mobility violation notification rule, executing the action by:
taking a picture using a camera contained within the wireless terminal;
sending a message from the wireless terminal, to a destination device via a supporting wireless network infrastructure, the message including the location information of the wireless terminal and the picture, the picture available to assist in locating a user of the wireless terminal.

14. The method of claim 13, wherein sending the message to the destination device via a supporting network infrastructure is selected from the group consisting of at least:
sending a message to a partnered wireless terminal;
sending a message to a partnered land line terminal; and
sending a message to a monitoring location.

15. The method of claim 13, wherein executing the action further comprises the wireless terminal issuing an audible alarm.

16. The method of claim 13, wherein executing the action further comprises:
determining a location of the wireless terminal by accessing the GPS receiver of the wireless terminal; and
transmitting the location of the wireless terminal to the destination device via the supporting wireless network infrastructure.

17. The method of claim 13, further comprising:
receiving a locate request from a querying device via the supporting wireless network infrastructure;
determining a location of the wireless terminal by accessing the GPS receiver of the wireless terminal; and
reporting the location of the wireless terminal to the querying device via the supporting wireless network infrastructure.

18. The method of claim 13, wherein the rate of motion of the wireless terminal compares unfavorably to the mobility parameter when the rate of motion exceeds a maximum speed limit.

19. The method of claim 13, wherein the rate of motion of the wireless terminal compares unfavorably to the mobility parameter when the rate of motion is less than a minimum speed limit.

20. The method of claim 13, wherein:
the mobility violation notification rule further comprises a time component; and
the action is executed only when a current time of the mobile terminal compares unfavorably to the time component.

21. The method of claim 13, further comprising:
receiving a location query from a monitoring device;
determining a location of the wireless terminal by accessing the GPS receiver; and
reporting the location of the wireless terminal to the monitoring device.

22. A wireless terminal comprising:
a wireless interface;
a user interface;
camera;
a Global Positioning System (GPS) receiver; and
a processing unit communicatively coupled to the wireless interface, to the user interface, to the camera, and to the GPS receiver and operable to:
enact a boundary violation notification rule that includes a geographic boundary and an action;
determine a location of the wireless terminal by accessing the GPS receiver;
compare the location of the wireless terminal to the geographic boundary of the boundary violation notification rule; and
when the location of the wireless terminal compares unfavorably to the geographic boundary, execute the action by;
directing the camera to take a picture; and
sending a message from the wireless terminal to a destination device via the wireless interface and a supporting wireless network infrastructure that includes the location of the wireless terminal and the picture, the picture available to assist in locating a user of the wireless terminal.

23. The wireless terminal of claim 22, wherein sending the message to the destination device via the supporting network infrastructure is selected from the group consisting of at least:
sending a message to a partnered wireless terminal;
sending a message to a partnered land line terminal; and
sending a message to a monitoring location.

24. The wireless terminal of claim 22, wherein in executing the action, the processor is further operable to issue an audible alarm via the user interface.

25. The wireless terminal of claim 22, the processing unit further operable to:
determine a rate of motion of the wireless terminal by accessing the GPS receiver; and
include the rate of motion of the wireless terminal with the message.

26. The wireless terminal of claim 22, wherein in executing the action, the processor is further operable to transmit the location of the wireless terminal to the destination device via the wireless interface and the supporting wireless network infrastructure.

27. The wireless terminal of claim 22, wherein:
the boundary violation notification rule further comprises a time component; and
the processor is operable to execute the action only when a current time of the mobile terminal compares unfavorably to the time component.

28. A wireless terminal comprising:
a wireless interface;
a user interface;
a camera;
a Global Positioning System (GPS) receiver; and a processing unit communicatively coupled to the wireless interface, the user interface, to the camera, and the GPS receiver and operable to:
  enact a mobility violation notification rule that includes a mobility parameter and an action;
  determine a rate of motion and a location of the wireless terminal by accessing the GPS receiver;
  compare the rate of motion of the wireless terminal to the mobility parameter of the mobility violation notification rule; and
  when the rate of motion of the wireless terminal compares unfavorably to the mobility parameter of the mobility violation notification rule, execute the action by:
    directing the camera to take a picture; and
    sending a message from the wireless terminal to a destination device via a supporting wireless network infrastructure that includes the location of the wireless terminal and the picture, the picture available to assist in locating a user of the wireless terminal.

29. The method of claim 28, wherein sending the message to the destination device via the supporting network infrastructure is selected from the group consisting of at least:
  sending a message to a partnered wireless terminal;
  sending a message to a partnered land line terminal; and
  sending a message to a monitoring location.

30. The method of claim 28, wherein in executing the action, the processor is further operable to issue an audible alarm via the user interface.

31. The method of claim 28, wherein in executing the action, the processor is further operable to:
  determine a location of the wireless terminal by accessing the GPS receiver; and
  transmit the location of the wireless terminal to the destination device via the wireless interface and the supporting wireless network infrastructure.

32. The method of claim 28, wherein the processor is further operable to:
  receive a locate request from a querying device via the supporting wireless network infrastructure and the wireless interface;
  determine a location of the wireless terminal by accessing the GPS receiver; and
  report the location of the wireless terminal to the querying device via the wireless interface and the supporting wireless network infrastructure.

33. The method of claim 13, wherein:
  the boundary violation notification rule further comprises a time component; and
  the processor is operable to execute the action only when a current time of the mobile terminal compares unfavorably to the time component.

* * * * *